United States Patent [19]

Roser et al.

[11] Patent Number: 4,513,563
[45] Date of Patent: Apr. 30, 1985

[54] LAWN MOWER ROTARY ASSEMBLY

[75] Inventors: Carl A. Roser, Lake City, Fla.;
Arthur J. Ehrler, Mission, Canada

[73] Assignee: Carl A. Roser, Kingsport, Tenn.

[21] Appl. No.: 469,170

[22] Filed: Feb. 23, 1983

[51] Int. Cl.³ .............................................. A01D 55/18
[52] U.S. Cl. ...................................... 56/295; 56/12.7; 56/17.5; 464/32
[58] Field of Search .............. 56/12.7, 17.5, 255, 56/295; 30/347, 276; 24/117, 122.6, 119, 115 A, 128; 464/32, 33

[56] References Cited

U.S. PATENT DOCUMENTS

| 3,208,209 | 9/1965 | Dunlap et al. | 56/295 |
| 3,364,500 | 1/1968 | Fox | 24/115 H |
| 3,988,810 | 11/1976 | Emery | 24/128 R |
| 4,054,992 | 10/1977 | Ballas et al. | 56/295 |
| 4,126,990 | 11/1978 | Fisher et al. | 56/295 |
| 4,187,598 | 2/1980 | Pittinger | 56/295 |
| 4,295,324 | 10/1981 | Frantello et al. | 56/295 |
| 4,357,789 | 11/1982 | Rodish | 56/295 |
| 4,362,007 | 12/1982 | Kennedy et al. | 56/295 |

FOREIGN PATENT DOCUMENTS

| 2556553 | 7/1977 | Fed. Rep. of Germany | 56/295 |
| 2282783 | 4/1976 | France | 56/12.7 |
| 103277 | 4/1923 | Switzerland | 24/115.8 |

Primary Examiner—Gene Mancene
Assistant Examiner—John G. Weiss
Attorney, Agent, or Firm—Arthur G. Yeager

[57] ABSTRACT

A lawn mower rotor assembly comprising a rotor body, filament cutting members, and a shear pin coupler, the rotor body being a flat star-shaped disk having five equally spaced arms projecting outwardly from the center of the rotor, each of the arms including near its outer periphery a lug for gripping one end of a short length of filament, the coupler being a disk fitting into a central counterbore in the rotary body having two cylindrical members projecting upwardly from the upper surface of the disk symmetrically positioned diametrically opposite from each other and mating with two recesses in the counterbore.

16 Claims, 11 Drawing Figures

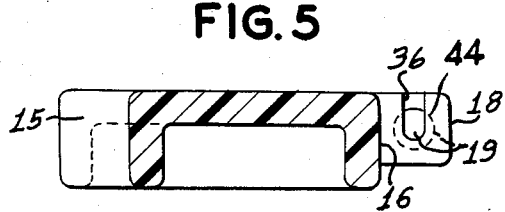
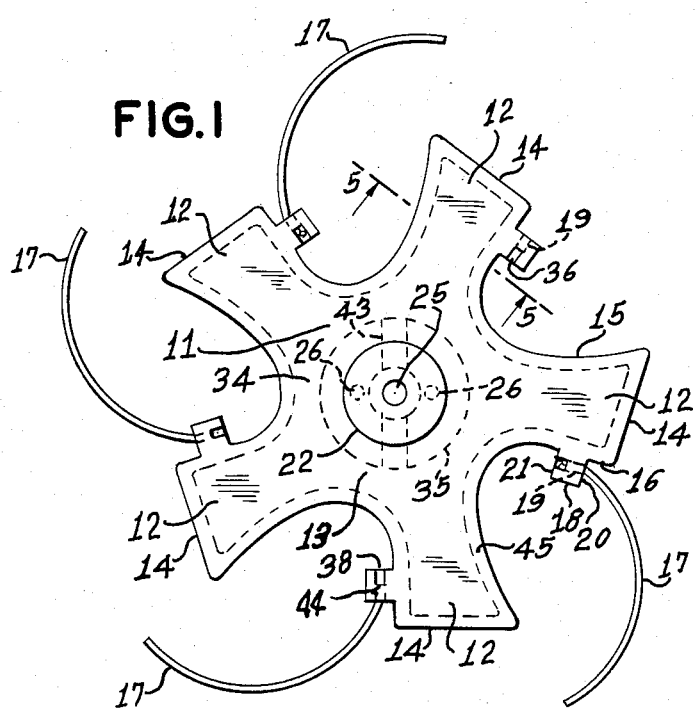
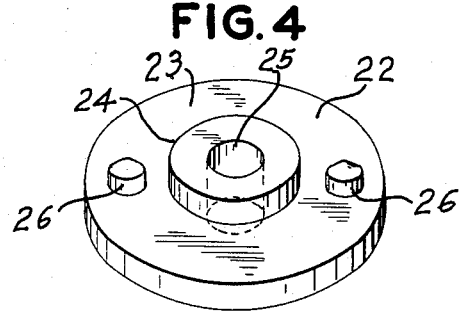
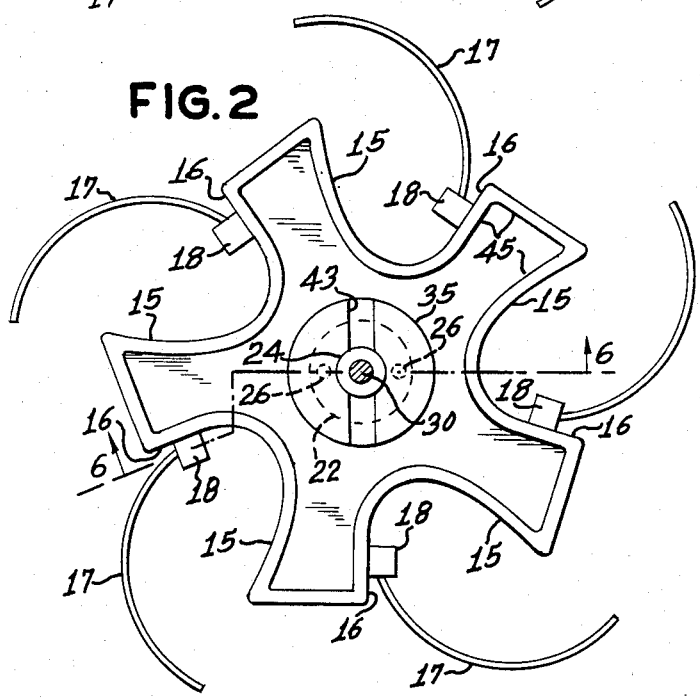
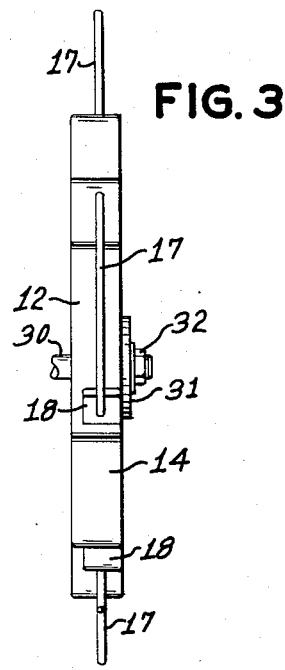
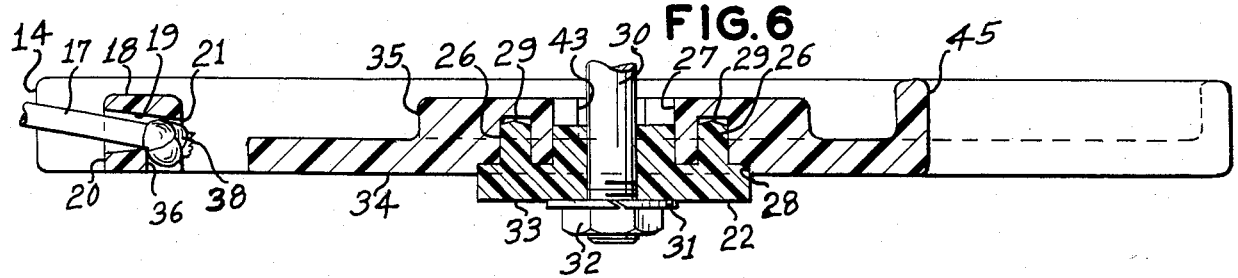

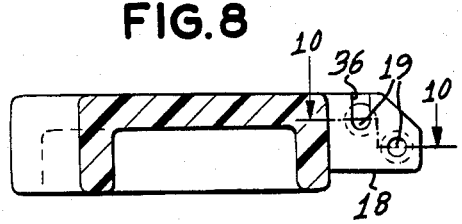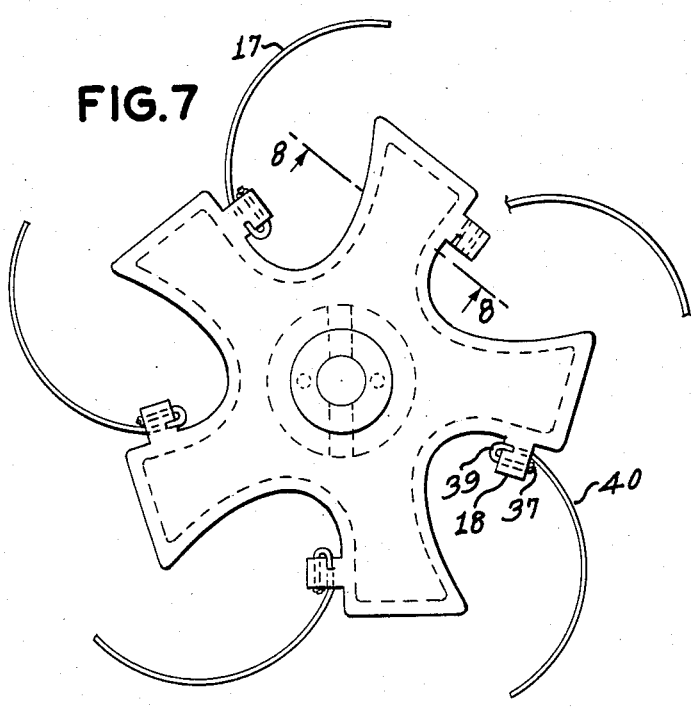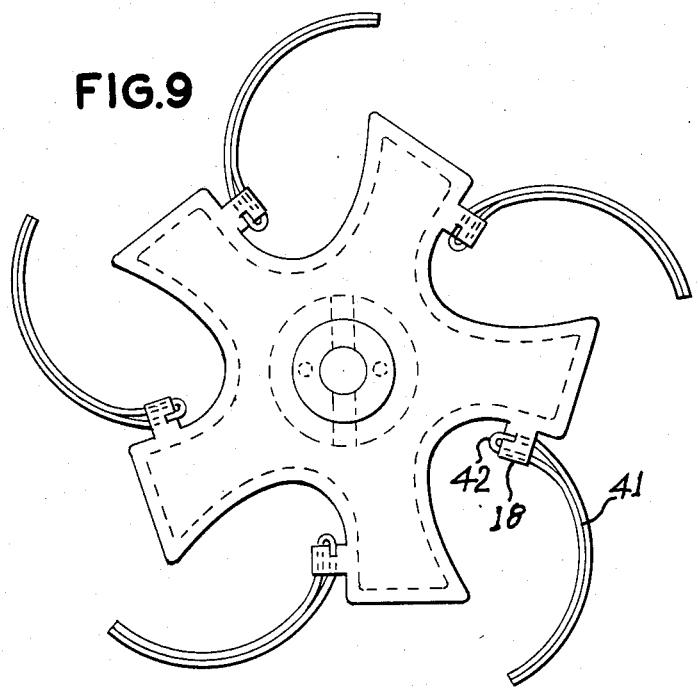

4,513,563

LAWN MOWER ROTARY ASSEMBLY

BACKGROUND OF THE INVENTION

Rotary lawnmowers employ a horizontally rotating blade which whirls at sufficiently high speeds to cut grass as the vehicle housing the rotating blade is moved over the lawn. The typical blade is a metal bar with a sharpened edge at each end of the bar and with means for mounting the bar on the rotating shaft of a motor so that the bar rotates in a horizontal plane with a cutting edge at each end of the bar. Many instances have occurred where persons were injured while operating a rotary lawnmower or while being an innocent bystander when the rotating bar hit a rock or other hard object causing chips from either the bar or from the hard object to fly out from underneath the mower hitting and injuring the person near by. In a more recent development the metal bar has been replaced by a tough synethic filament, e.g. nylon, which extends outwardly from a central rotor and the whirling filament acts like the small end of a whip cutting the grass in an efficient and proper manner. The advantage of employing the filament cutter in place of a metal blade is that when the filament cutter hits a hard object such as a rock it will not break the rock and cause any flying chips to be flung outwardly with the possibility of injuring any person neary.

It is an object of the present invention to provide a well designed rotor assembly employing filament cutting members. It is another object of this invention to provide a rotor assembly employing filament cutting members and having shear pins as a safety provision. Still other objects will be apparent from the more detailed description of this invention which follows.

BRIEF DESCRIPTION OF THE INVENTION

This invention provides a rotor assembly for a rotary lawnmower comprising a rotor body, filament cutters, and a shear pin coupler; the rotor body being a flat star-shaped disk having five equally spaced identical arms projecting outwardly from the center of the rotor, each of the arms including near its outer periphery a lug for gripping one end of a short length of filament; the coupler being a disk fitting into a central counterbore in the rotor body and having two cylindrical members projecting upwardly from the upper surface of the disk and being symetrically positioned diametrically opposite from each other and mating with two recesses in the counterbore. In specific embodiments of this invention each lug contains two parallel passageways through which the filament cutting member can be threaded and gripped.

BRIEF DESCRIPTION OF THE DRAWINGS

The novel features believed to be characteristic of this invention are set forth with particularity in the appended claims. The invention, itself, however, both as to its organization and method of operation, together with further objects and advantages thereof, may best be understood by reference to the following description taken in connection with the accompanying drawings in which:

FIG. 1 is a top plan view of one embodiment of the rotor assembly of this invention.

FIG. 2 is a bottom plan view of the rotor assembly of FIG. 1.

FIG. 3 is a side elevational view of the rotor assembly in FIG. 2.

FIG. 4 is a isometric view of the shear pin coupler of this invention.

FIG. 5 is a cross sectional view taken at 5—5 of FIG. 1.

FIG. 6 is a cross sectional view at 6—6 of FIG. 2.

FIG. 7 is a top plan view of a second embodiment of the rotor assembly of this invention.

FIG. 8 is a cross sectional view taken at 8—8 of FIG. 7.

FIG. 9 is a top plan view of a third embodiment of the rotor assembly of this invention.

FIG. 10 is a cross sectional view taken at 10—10 of FIG. 8.

FIG. 11 is another embodiment of the cross sectional view of FIG. 10.

DETAILED DESCRIPTION OF THE INVENTION

In FIGS. 1-6 the structure and the features of the rotor assembly of this invention can best be understood. The rotor assembly comprises three parts; namely a rotor body 11, a shear pin coupler 22, and filament cutters 17. Rotor body 11 is a flat star-shaped article having a plurality of arms projecting outwardly from a central portion of the body. The number of arms employed is not critical but should be in the range of 3-6 and be spaced equally from each other so as to produce a symetrical and balanced structure which can rotate freely about a central axis. In the practice of this invention it is preferred to employ an object having five arms 12 attached to a central portion 13 of rotor body 11. Each arm has a linear outer edge 14 connected to central portion 13 by means of an arcuate leading edge 15 and an arcuate trailing edge 16. The resulting figure, as may be seen is a star having somewhat elongated, straight outer edges 14 that are positioned substantially tangential to the outer circumference of the rotor body 11 and with the two ends of outer edges 14 joined to the central portion 13 of rotor body 11 by curved leading edges 15 and trailing edges 16.

Each arm 12 carries a lug 18 on its trailing edge 16 and located adjacent to outer edge 14. Lug 18 contains a passageway 19 and serves as a point of attachment for filament cutters to rotor body 11. A short length of filament 17 is threaded through passageway 19 and secured by a gripping means to lug 18 with the free end of filament 17 extending outwardly and trailing behind trailing edge 16. In the embodiment shown in FIG. 1 passageway 19 is made just large enough to receive filament 17 therethrough and filament 17 is prepared with an enlarged portion 38 which is larger than passageway 19 and thus prevents filament 17 from being pulled through passageway 19. The centrifugal force on filament 17 when rotor body 11 is being rotated in its normal use in a lawn mower is sufficient to maintain the free end of filament 17 beyond lug 18 and to cause the enlarged portion 38 of filament 17 to be pushed snugly into the end of passageway 19. Enlarged portion 38 may be formed in any of a variety of ways including the tying of a knot in the filament 17 at that location. Another means of forming the enlarged portion is to heat that end of the filament to its softening point and to form an enlarged portion of the filament by an upsetting operation. It is apparent that the threading of a length of filament 17 having an enlarged portion 38 on one end of the filament is accomplished by threading the free end of filament 17 from the inboard end of passageway 19. In order to provide an easier access to passageway 19 for the threading operation a groove 36 is cut through a portion of lug 18 from passageway 19 to an outer surface of lug 18, in this instance the top surface of lug 18. This permits the free end of filament 17 to be placed in groove 36 and pushed through passageway 19.

The third component of the rotor assembly of this invention is the shear pin coupler which is shown in FIG. 4 apart from the rest of the assembly. The coupler 22 comprises a flat circular disk 23 having a central hub portion 24 projecting upwardly therefrom and a central bore 25 through both of hub portion 24 and plate portion 23. Cylindrical pins 26 project upwardly from plate portion 23 and form the shear pin structure of this component. It is not critical that there be any special number of shear pins 26 although for purposes of symmetry and balance it is preferred to employ at least two such pins 26. Central bore 25 is employed to mate with a driving shaft of the lawn mower on which the rotor assembly of this invention is to be mounted.

As may be seen in FIGS. 1,2, and 6 coupler 22 mates with a structure in the center of rotor body 11. That central structure in rotor body 11 comprises a bore 27 which is slightly larger than the outer circumference of hub portion 24 of coupler 22. Counterbore 28 in rotor body 11 receives plate portion 23 of coupler 22, and in counterbore 28 there are recesses 29 to receive shear pins 26. When coupler 22 is fitted into the bore 27 and counterbore 28 of rotor body 11 the outer surface 33 of coupler 22 will project outwardly from upper surface 34 of rotor body 11 so that when the rotor assembly is mounted on the motor shaft 30 it may be tightened thereon by the use of washer 31 and nut 32 to tighten the entire assembly against coupler 22. This is necessary so that the safety features of shear pin 26 can operate properly as will be described below. In order to accommodate counterbore 28 and recesses 29 a boss 35 may be incorporated into the opposite surface of rotor body 11. This permits the remaining portions of rotor 11 to be made as thin as possible for lightness of weight and yet provides the necessary strength properties. Slot 43 extends diametrically through boss 35 and serves the purpose of providing clearance for alignment pins which protrude from motor shaft 30 in certain types of lawn mowers.

In FIG. 6 there may be seen the manner in which the three components of the rotor assembly are attached to the motor of the lawn mower through motor shaft 30. When the rotor assembly is mounted on the motor shaft 30 upper surface 34 of rotor body 11 and upper surface 33 of coupler 22 will be facing downwardly toward the grass which is to be cut. It may be seen with the outer shape of coupler 22 being circular, and the outer shape of hub portion 24 being circular the only connection between rotor body 11 and coupler 22 for power transmission is through shear pins 26 and recesses 29. If filament cutter 17 or rotor body 11 should hit a firmly placed rock or other substantially immovable object, pins 26 will be sheared and shaft 30 will be free to rotate without causing the rotation of rotor body 11 this safety feature will eliminate the possibility of breaking rotor body 11 into pieces that might be thrown outwardly and injure persons nearby or alternatively will prevent serious damage to the motor or to its shaft 30.

It is contemplated that rotor body 11 and coupler 22 will be molded and/or machined from a plastic material such as polyolefin, ABS plastic, polyacrylics, etc., and it may be seen in FIG. 6 that there are stiffening webs 45 around the outer portion of rotor body 11 in order to provide the necessary strength properties without employing the solid structure of an unnecessarily high weight.

Lug 18 is shown in FIG. 6 in cross section indicating that passageway 19 is tapered with the large end of the taper at outboard end 20 and the small end of the taper at inboard end 21 of passageway 19. Enlarged portion 38, which may be a knot in filament 17, is jammed against inboard end 21 of passageway 19 while the free end of filament 17 extends outwardly from outboard end 20 which is enlarged because of the taper in passageway 19. The enlargement of passageway 19 at outboard end 20 permits filament cutter 17 to bend in any direction easily without having any sharp corners which might stress the filament 17 unnecessarily and shorten its life thereby. There can also be seen groove 36 in lug 18 which permits one to thread a new filament 17 through passageway 19 quicker and easier than would be the case in the absence of the groove 36.

In FIGS. 7-11 there may be seen two embodiments of this invention which differ slightly from that of FIGS. 1-6. In the embodiment shown in FIGS. 1-6 there is a single passageway 44 through each lug 18 to receive a filament 17 as shown in FIG. 6. In the embodiments of FIGS. 7-11 each lug 18 contains two parallel passageways 19 to receive filament 17 in a different manner from that shown in FIGS. 1-6. Other than this alternative design of lugs 18 the remainder of the rotor assembly is exactly the same as that described above with respect to FIGS. 1-6.

In these alternatives embodiments two passageways 19 are positioned parallel through lug 18 in a radial direction with respect to rotor assembly 11. In the embodiment shown in FIGS. 7 and 10 the filament cutter 17 is attached to lug 18 in the form of the letter J. In the embodiment shown in FIGS. 9 and 11 the filament 17 is attached to lug 18 in the form of the letter U. In FIG. 10 it may be seen that enlarged portion 37 is jammed into outboard end 20 (the large end of taper in passageway 19). Filaments 17 extends from enlarged portion 37 inwardly through passageway 19 and through inboard end 21 of that passageway and then doubled back at 39 to enter inboard end 21 of the other passageway 19 and to extend outwardly from the outboard end 20 of that passageway to a free end 40 substantially the same as the free end of filament 17 in FIGS. 1-6. This method of doubling filament 17 back upon itself through two passageways 19 is a more secure attachment of filament 17 to lug 18 than the single passageway shown in FIGS. 1-6.

In the embodiment shown in FIGS. 9 and 11 there is no enlarged end portion of filament 17. Instead the filament 17 is made into a double filament with a bend in the filament occurring at its middle point 42 and this middle point is made to occur at the inboard ends 21 of passageways 19 in lugs 18. Thus filament 17 is threaded from the outboard end of one passageway 19 and exits the inboard end of that same passageway and is then doubled back and enters through the inboard end 21 of the other passageway 19 with its free ends 41 extending outwardly from the outboard ends 20 of passageways 19. Since free ends 41 are both substantially equal in length there is no need to employ an enlarged portion to attach the filament to lug 18. Furthermore this provides a double strength cutter and permits longer usage, if, for example, one filament strand should become broken in use. In these embodiments of FIGS. 7–11 there is preferably employed a groove 36 extending from one inboard end 21 of one passageway 19 to an outer surface of lug 18 to facilitate the threading of the filament which is doubled back through lug 18 at the inboard end 21.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A rotor assembly for a rotary lawn mower comprising a rotor body, filament cutters, and a shear pin coupler; said rotor body being a flat star-shaped disk having a plurality of equally spaced identical arms projecting outwardly from the center of said rotor, each of said arms having an arcuate leading edge and an arcuate trailing edge connecting the center of the rotor body to respective ends of the outer periphery of the rotor body, each of said arms including near its outer periphery a lug for gripping one end of a short length of filament, each said lug being located on said trailing edge adjacent the outer edge of respective said arm, each said lug having a passageway therethrough in the radial direction with respect to said rotor body for passing the short length of filament therethrough with the filament being disposed in generally the same arcuate direction as said arcuate trailing edge during rotation of said rotor assembly; said coupler being a disk fitting into a central counterbore in said rotor body and having two cylindrical members projecting upwardly from the upper surface of said disk and symmetrically positioned diametrically opposite from each other, the said menbers mating with two recesses in said counterbore, said disk having a central hub portion projecting upwardly for accommodating a drive shaft of a rotary lawn mower, said cylindrical members being sheared when said rotor engages an immovable object to minimize damage to said rotor and a motor driving same.

2. The rotor assembly of claim 1 wherein each said lug contains another passageway parallel to said passageway in the radial direction with respect to said rotor body for accommodating the short length of filament in both said passageways.

3. The rotor assembly of claim 2 wherein both of said passageways are tapered with the large end of the taper at the outboard end of respective said passageway.

4. The rotor assembly of claim 2 wherein said filament is threaded through both said passageways with one end of the filament having an enlarged portion, larger than the cross section of the passageway, at the outboard end of one passageway and the free end of the filament extending outwardly from the outboard end of the other passageway.

5. The rotor assembly of claim 2 wherein said filament is threaded through both said passageways with the middle of said filament at the inboard ends of both passageways and two substantially equal length free ends of the filament extending outwardly, respectively, from each of the outboard ends of said passageways.

6. The rotor assembly of claim 1 wherein said rotor body has a central axial bore to receive said hub portion of said coupler and a counterbore to receive said disk so that the outer surface of said coupler when positioned in said counterbore projects outwardly from the surface of the rotor body adjacent said counterbore.

7. A rotor assembly for a rotary lawn mower comprising a rotor body, filament cutters, and a shear pin coupler; said rotor body, being a flat star-shaped disk having a plurality of equally spaced identical arms projecting outwardly from the center of said rotor, each of said arms including near its outer periphery a lug for gripping one end of a short length of filament, said lug includes two parallel passageways extending in the radial direction with respect to said rotor body, said filament being threaded through both said passageways, said coupler being a disk fitting into a central counterbore in said rotor body and having two cylindrical members projecting upwardly from the upper surface of said disk and symmetrically positioned diametrically opposite from each other, the said members mating with two recesses in said counterbore.

8. The rotor assembly of claim 7 wherein both of said passageways are tapered with the large end of the taper at the outboard end of respective said passageway.

9. The rotor assembly of claim 6 wherein said filament has only one free end for cutting the lawn.

10. The rotor assembly of claim 6 wherein said filament has two substantially equal free ends for cutting the lawn.

11. A rotor assembly for a rotary lawn mower comprising a rotor body, filamentary cutting members, and a shear pin coupler; said rotor body being a flat star-shaped plate having five identical arms extending outwardly from the central portion of said rotor body at equal angles from each other, each arm having an elongated flat outer edge positioned substantially tangent to the circumference of said rotor body and an arcuate leading edge and an arcuate trailing edge extending from each respective end of the outer edge to the central portion of said rotor body, a lug member projecting outwardly from said trailing edge of each said arm adjacent said outer edge and containing a passageway therethrough generally in the radial direction with respect to said rotor body, each said passageway having an outboard end adjacent said outer edge of said arm and an inboard end adjacent said central portion of said rotor body, each said passageway being of a size to respectively receive one of said filamentary cutting members threaded therethrough and for retaining said cutting member in said passageway; said shear pin coupler having a flat plate portion with a central hub portion projecting upwardly from one face thereof and having a central axial bore through said hub portion and said plate portion and two spaced pin members projecting upwardly from said one face of said plate portion; said rotor body having a central bore to receive said hub portion of said coupler, a counterbore in said rotor body to receive said plate portion of said coupler and two spaced recesses to receive said spaced pin members of said coupler, the outer surface of said coupler when mated in said bore and counterbore of said rotor body being projected outwardly from the adjacent surface of said rotor body.

12. The rotor assembly of claim 11 wherein each said lug contains another passageway parallel to said passageway for accommodating said cutting member in both said passageways.

13. The rotor assembly of claim 12 wherein each said cutting member includes a single length of filament for each lug and threaded through both passageways with an enlarged portion at one end of said filament larger than the cross section of one passageway, and positioned at the outboard end of one of said passageways and the filament doubled back through the other of said passageways with the free end of the filament extending outwardly from the outboard end of the other passageway.

14. The rotor assembly of claim 12 wherein each of said passageways is tapered from the outboard end decreasingly towards the inboard ends of said lugs.

15. The rotor assembly of claim 12 wherein each said filamentary cutting member comprises a length of filament threaded through both of said passageways with both ends of the filament extending outwardly substantially coextensively from the outboard ends thereof, respectively.

16. The rotor assembly of claim 15 wherein each of said passageways is tapered from the outboard end decreasingly towards the inboard ends of said lugs.

* * * * *